UNITED STATES PATENT OFFICE.

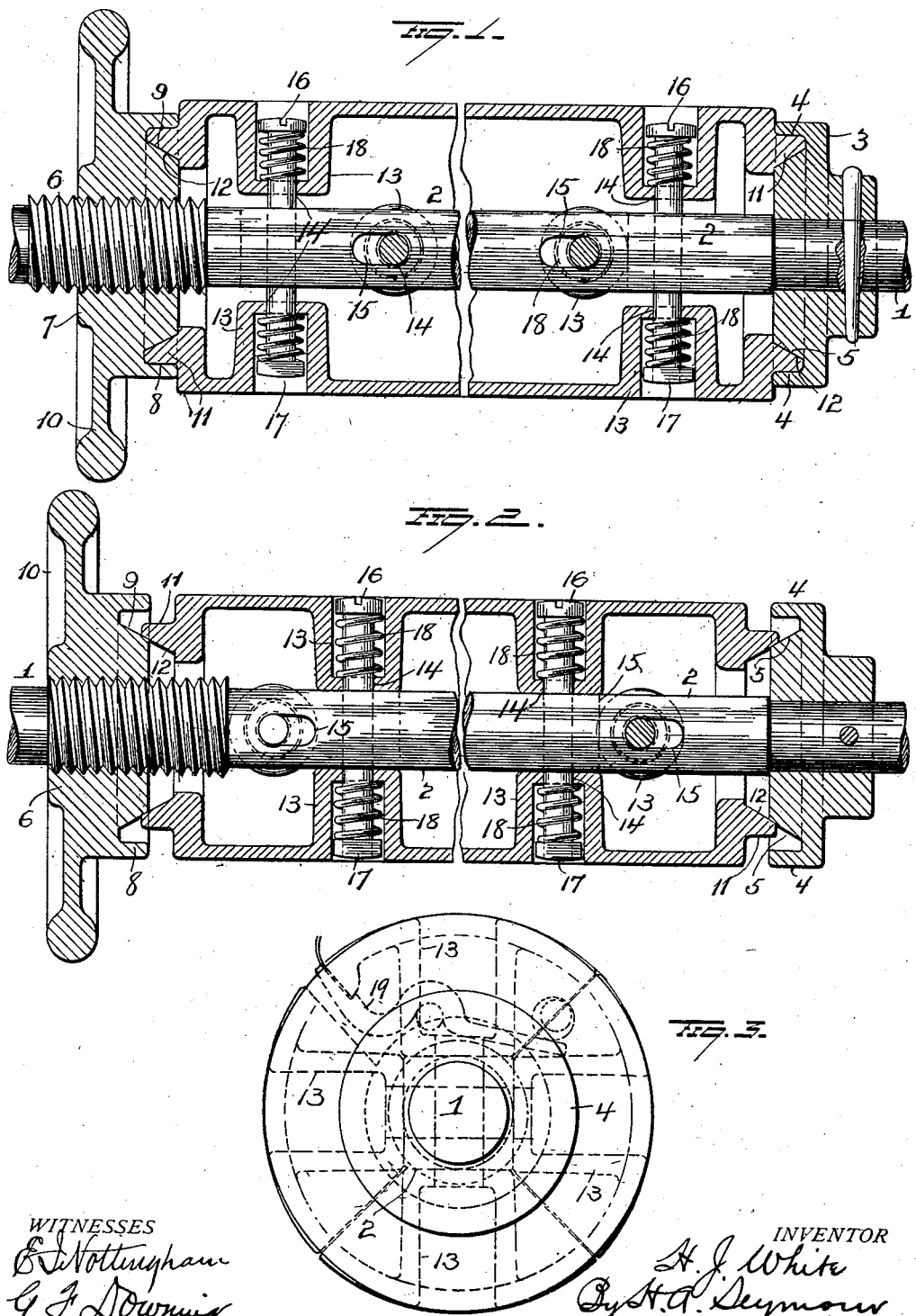

HENRY J. WHITE, OF MORRISTOWN, NEW JERSEY, ASSIGNOR TO T. M. DUCHE & SONS, OF NEW YORK, N. Y.

EXPANSIBLE MANDREL.

1,077,110. Specification of Letters Patent. Patented Oct. 28, 1913.

Application filed July 16, 1912, Serial No. 709,743. Renewed August 29, 1913. Serial No. 787,395.

*To all whom it may concern:*

Be it known that I, HENRY J. WHITE, a citizen of the United States, residing at Morristown, in the county of Morris and State of New Jersey, have invented certain new and useful Improvements in Expansible Mandrels; and I do hereby declare the following to be a full, clear, and exact description of the invention, such as will enable others skilled in the art to which it appertains to make and use the same.

This invention relates to improvements in expansible mandrels, and more particularly to such as are adapted for use in winding sheet metal as the same comes from the rolling mill and slitting mechanism,—the object of the invention being to provide a winding mandrel which shall be simple in construction, which may be easily expanded or contracted, and which shall effectually perform all its functions.

With this object in view, the invention consists in certain novel features of construction and combinations of parts as hereinafter set forth and pointed out in the claim.

In the accompanying drawings, Figures 1 and 2 are longitudinal sectional views showing the parts in different positions; and Fig. 3 is an end view.

1 represents a shaft, the intermediate portion, 2, of which may be made angular (preferably square) in cross section. At one end of the angular portion 2, a head 3 is keyed to the shaft and provided in its inner face with an annular groove 4, the inner wall 5 of said groove being beveled to form a cam surface. Beyond the opposite end of the angular intermediate portion of the shaft, the latter is provided with a screw thread 6 for the accommodation of a head 7. This head is also made in its inner face with an annular groove 8, the inner wall 9 of which is beveled to form a cam surface. The head 7 is also provided with a hand wheel 10 for turning the same on the threaded portion of the shaft and adjusting it longitudinally thereon.

The body of the mandrel comprises a plurality of transversely curved segments (four being shown in the drawing), and each segment is provided at both of its ends with curved segmental ribs 11, the ribs at respective ends of the several segments coöperating to form, in effect, broken annular ribs to enter the grooves 4 and 8 in the heads 3 and 7. The inner faces 12 of the ribs 11 are beveled to form cam surfaces, so that when the head 7 is moved on the shaft toward the segments, the cam faces 5 and 9 of the heads, coöperating with the cam faces 12 of the ribs will cause the segments to be moved radially and thus expand the body of the mandrel.

Each mandrel segment is provided with a plurality of pockets 13, each having a hole 14 in its bottom, and the pockets of one segment are disposed in line with the pockets of the diametrically opposite segment. Bolts pass through the holes of each pair of alining pockets and through elongated slots 15 in the portion 2 of shaft, the ends of said bolts terminating in the pockets. Each bolt is provided at one end with a head 16 and at the other end with a nut 17, these heads and nuts forming abutments for the outer ends of springs 18 located in the pockets the inner ends of said springs having bearings in the bottoms of the pockets.

It is apparent from this construction and arrangement of parts, that when the head 7 is moved outwardly on the shaft from the position shown in Fig. 1, the springs will be free to operate to move the segments radially in an inward direction and thus contract the size of the mandrel, so as to permit the ready removal therefrom of a roll of sheet metal which has been wound thereon. For the purpose of securing the end of the material to be wound, to the mandrel, a clamp 19 will be employed.

Various slight changes might be made in the details of construction of my invention without departing from the spirit thereof or limiting its scope and hence I do not wish to restrict myself to the exact details herein set forth.

Having fully described my invention what I claim as new and desire to secure by Letters-Patent, is:—

In an expansible winding mandrel, the combination with a shaft having elongated slots, of heads on said shaft having annular cam faces, curved segments surrounding the shaft and having cam faces at their ends to coöperate with the cam faces of the heads, means for moving one of said heads on the shaft, pockets in said segments, bolts passing transversely through the elongated slots of the shaft, each bolt terminating in pockets of diametrically opposite segments, and provided at its ends with abutments and springs located in said pockets between the abutments at the end of the bolts and the bottoms of the pockets.

In testimony whereof, I have signed this specification in the presence of two subscribing witnesses.

HENRY J. WHITE.

Witnesses:
G. K. GRIENLY,
HAROLD E. SMITH.

Copies of this patent may be obtained for five cents each, by addressing the "Commissioner of Patents, Washington, D. C."